United States Patent [19]

Weavers et al.

[11] Patent Number: 4,564,878

[45] Date of Patent: Jan. 14, 1986

[54] CASSETTE REMOVABLE PIECE

[75] Inventors: Mark W. Weavers, Little Canada; Charles D. Gebeke, White Bear Lake, both of Minn.; Ken'ichi Yamasaki, Tokyo, Japan

[73] Assignee: Minnesota Mining and Manufacturing Company, Saint Paul, Minn.

[21] Appl. No.: 577,778

[22] Filed: Feb. 7, 1984

[51] Int. Cl.[4] ........................ G11B 23/02; G11B 15/04

[52] U.S. Cl. ....................................... 360/132; 360/60; 242/199

[58] Field of Search .................. 360/60, 132; 206/387; 242/199

[56] References Cited

U.S. PATENT DOCUMENTS

| | | | |
|---|---|---|---|
| 2,612,565 | 9/1952 | Heller | 360/60 |
| 3,686,470 | 8/1972 | Stahlberg et al. | 360/60 X |
| 3,839,736 | 10/1974 | Hoshall | 360/60 X |
| 4,012,011 | 3/1977 | Saito | 360/60 X |
| 4,320,421 | 3/1982 | Larson et al. | 360/60 |

FOREIGN PATENT DOCUMENTS 0045082 3/1982 European Pat. Off. .

OTHER PUBLICATIONS

"Specification for 8 mm Video Cassette", Mar. 1983, from the Electronic Industries Association of Japan.

*Primary Examiner*—Raymond F. Cardillo, Jr.
*Assistant Examiner*—Alyssa H. Bowler
*Attorney, Agent, or Firm*—Donald M. Sell; James A. Smith; William L. Huebsch

[57] ABSTRACT

One broad wall of a recording cassette has a recognition hole which is covered by a breakout tab (here called a "removable piece"), and there is a chamber projecting from the other broad wall of the cassette such that a punch which dislodges the removable piece permanently wedges it into the chamber.

9 Claims, 5 Drawing Figures

16' 27 22 26 24 21 20 12 16 28

CASSETTE REMOVABLE PIECE

FIELD OF THE INVENTION

The invention concerns a removable piece, sometimes called a breakout tab, such as is commonly found in recording casettes, usually having a record-disable function.

BACKGROUND ART

Cassette recorders are generally provided with feelers which disable the record function when they enter an opening in the wall of a cassette. An unrecorded cassette may have a tab at that opening which the user may break out after making a recording, thus preventing accidental erasure. After breaking out the tab, the opening may be covered with tape to make a new recording. Some cassettes have built-in slides which can be moved repeatedly to cover and uncover the record-disable opening.

"Specifications for 8 mm Video Cassette" dated March 1983 have been distributed by Electronic Industries Association of Japan. Those specifications show a record-disable opening called "mis-erasure protection hole", and five openings called "recognition holes", all in the broad wall of the lower shell of the cassette. Each of the recognition holes is originally closed by a breakout tab, called "removable piece" in the specifications. The removable piece may be a disk integrally molded with the base shell and recessed 1.2 mm beneath the exterior face of its broad wall. If punched out from beneath the cassette, the disk would tend to remain loose within the cassette and might later block one of the recognition holes. Since the disk after being punched out tends to at least equal the diameter of its hole, it would be difficult to design a punch that would hold the disk for retrieval through the recognition hole.

To avoid such problems, many potential manufacturers of the 8 mm video cassette are leaving corresponding holes in the broad wall of the cover shell in order to punch out each removable piece from the top. It would be esthetically more pleasing to avoid these holes in the cover shell.

THE PRESENT INVENTION

The present invention enables one to break out the disk or other removable piece of a recognition hole of an 8 mm video cassette from the bottom without the piece remaining loose within the cassette. The invention also can be used for the breakout tab of any recording cassette, cartridge or magazine, all of which are below called "cassette".

In short, the invention concerns a recording cassette comprising a pair of shells, each having one broad wall, a removable piece in one broad wall, and a chamber projecting from the other broad wall. The chamber has an opening for receiving the removable piece. In an area well beyond the maximum penetration of hole-sensing mechanisms of any 8 mm video cassette tape deck, the interior of the chamber is smaller than the piece so as to retain the piece permanently when the piece is forced into the chamber.

For simplicity, the removable piece is a disk and the interior of the chamber is frusto-conical, exceeding the diameter of the disk at the opening of the chamber and less than the diameter of the disk into its closed end. In such a construction the disk preferably is formed with a flange which projects into the chamber and has an exterior frusto-conical surface matching the chamber interior. This helps to assure that the broken-out disk becomes squarely seated in the chamber. The outer flange of a disk can be either continuous or discontinuous.

A removable piece which is generally hemispherical in shape would both be easy to mold and to guide into the chamber.

THE DRAWING

DETAILED DESCRIPTION

Figure 1:
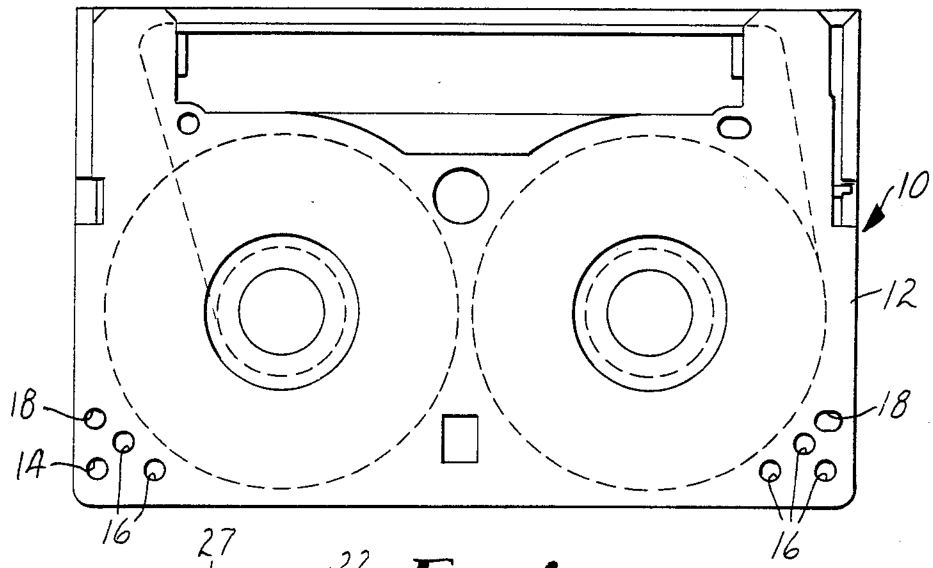
FIG. 1 is a schematic plan view of the underside of an 8 mm video cassette.
Figure 2:
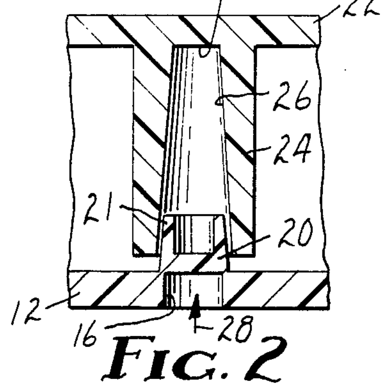
FIG. 2 is a fragmentary longitudinal cross-section through one of the recognition holes of the cassette of FIG. 1.

The cassette 10 shown in FIG. 1 is plastic and has a base shell 12 which is formed with a mis-erasure hole 14, five recognition holes 16, and two datum holes 18 which are used for positioning the cassette on a tape deck. As seen in FIG. 2, each of the recognition holes is originally closed by a breakout tab or removable piece in the form of a disk 20. The disk 20 has a flange 21 which projects into a chamber 24 formed in a shell 22. The chamber 24 has an opening for receiving the disk 20 after it is punched inwardly. The interior 26 of the chamber 24 is frusto-conical and has a 3°-4° taper so as to be constricted toward its closed end 27. The disk 20 and its flange 21 have a frusto-conical exterior matching the interior 26 of the chamber. A punch (not shown) moving in the direction of the arrow 28 would dislodge the disk 20 and force it into the chamber until becoming permanently wedged after reaching approximately the midpoint of the chamber.

Figure 3:
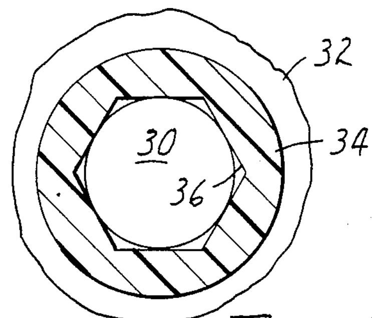
FIG. 3 is a fragmentary lateral cross-section through a recognition hole of another cassette of the invention showing a removable piece wedged in the chamber.

In FIG. 3, projecting from a cover shell 32 of a cassette is a chamber 34, the interior 36 of which is hexagonal in cross-section. Preferably the cross-sectional hexagons become smaller toward the closed end of the chamber so that a broken-out disk 30 becomes wedged as shown after reaching approximately the midpoint of the chamber.

Figure 4:
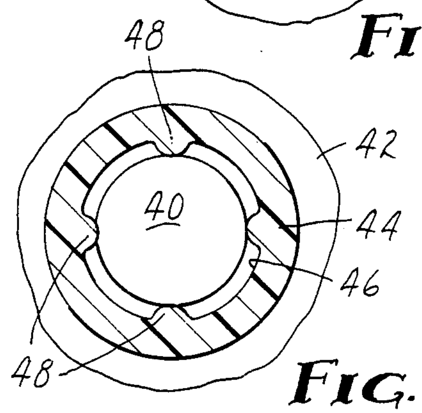
FIG. 4 is a fragmentary lateral cross-section through a recognition hole of a third cassette of the invention.

In FIG. 4, projecting from a cover shell 42 of a cassette is a chamber 44 which has a cylindrical or frusto-conical interior 46 and four inwardly projecting ribs 48 extending in the axial direction. The clearance between the ribs exceeds the diameter of a broken-out disk 40 at the opening of the chamber and becomes smaller than the diameter of the disk toward the closed end of the chamber.

Figure 5:
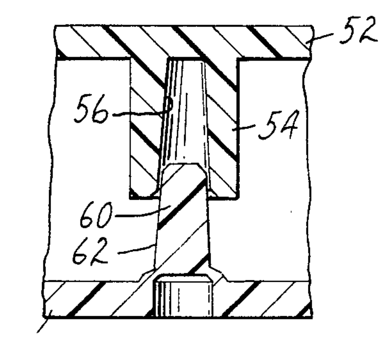
FIG. 5 is a fragmentary longitudinal cross-section through a recognition hole of a fourth cassette of the invention.

In FIG. 5, projecting from a cover shell 52 of a cassette is a chamber 54 having a frusto-conical interior 56 with a 2°-3° taper. Integrally molded with a base cover 58 is a removable piece 60 which has a frusto-conical exterior 62 matching the interior 56 of the chamber 54.

Each removable piece of FIGS. 2-5 becomes frictionally wedged its chamber after moving to a clearance of at least 5 mm from the exterior face of the broad wall of the base shell. Instead of becoming frictionally wedged, it would be equivalent to form a chamber which loosely receives a broken-out piece and to use an ultrasonic punch to weld the piece to the chamber.

We claim:

1. A recording cassette comprising a pair of shells, each having a broad wall, and a length of recording medium within the shells, said shells including a removable piece adapted to be broken from one broad wall to form a hole that can be recognized by a hole-sensing mechanism of a deck adapted to receive the cassette and a chamber projecting from the other broad wall, said chamber having an inner surface defining an opening adjacent to and larger than said removable piece for receiving the removable piece, and a tapered interior having a portion smaller than the piece that will frictionally engage and permanently retain the removable piece when the removable piece is forced into the chamber.

2. A recording cassette as defined in claim 1 wherein the removable piece is disk-like in shape.

3. A recording cassette as defined in claim 2 wherein the removable piece is formed with a flange projecting into the chamber before the removable piece is broken from the broad wall.

4. A recording cassette as defined in claim 3 wherein the inner surface of the chamber is frusto-conical in shape.

5. A recording cassette as defined in claim 4 wherein said removable piece and said flange have a frusto-conical exterior surface matching the inner surface of the chamber.

6. A recording cassette as defined in claim 1 wherein the inner surface of the chamber has a polygonal cross-sectional shape.

7. A recording cassette as defined in claim 6 wherein the inner surface of the chamber has a hexagonal cross-sectional shape.

8. A recording cassette as defined in claim 1 wherein the inner surface of the chamber is defined by at least one radially inwardly projecting rib extending axially of the chamber.

9. A recording cassette as defined in claim 8 wherein the inner surface of the chamber is defined by a plurality of radially extending inwardly projecting ribs.

* * * * *